United States Patent
Peikert

[11] 4,025,008
[45] May 24, 1977

[54] INTAKE CONTROL FOR AIR UTILIZING AIRCRAFT ENGINES

[75] Inventor: Jüergen Peikert, Munich, Germany

[73] Assignee: Messerschmitt-Bolkow-Blohm GmbH, Munich, Germany

[22] Filed: May 11, 1976

[21] Appl. No.: 685,342

Related U.S. Application Data

[63] Continuation-in-part of Ser. No. 526,005, Nov. 21, 1974, abandoned.

[30] Foreign Application Priority Data

Nov. 27, 1975  Germany ............................ 2358926

[52] U.S. Cl. .............................. 244/53 B; 137/15.2
[51] Int. Cl.² ......................................... B64D 33/02
[58] Field of Search ................. 244/53 B, 181, 195; 137/15.1, 15.2

[56] References Cited

UNITED STATES PATENTS

| | | | |
|---|---|---|---|
| 2,969,939 | 1/1961 | Sulkin et al. | 244/53 B |
| 2,997,843 | 8/1961 | Arnett et al. | 244/53 B |
| 3,181,817 | 5/1965 | Marcus et al. | 244/53 B |
| 3,266,239 | 8/1966 | Simpson et al. | 137/15.2 |
| 3,533,238 | 10/1970 | Marvin | 137/15.2 X |

OTHER PUBLICATIONS

Loschke, Def. Pub. of S.N. 853,601, filed 8-20-1969, published in 875 O.G. 361 on 6-16-1970, Def. Pub. No. T875,015.

*Primary Examiner*—Trygve M. Blix
*Assistant Examiner*—Barry L. Kelmachter
*Attorney, Agent, or Firm*—Woodhams, Blanchard and Flynn

[57] ABSTRACT

An air intake control for an air utilizing jet aircraft engine. The control is provided with fixed and movable air intake control ramps and the positioning of such movable ramps for air control purposes is determined by the static pressure above one thereof modified by the static pressure of the external air flow, the total pressure and the angle of attack of the aircraft. One control parameter is produced by a device responsive to the relationship between the static pressure above the one movable ramp and the total pressure of the external air flow. Particularly, this pressure relationship is calculated as a function of the operating cylinder feedback signal indicating the actual position of the center ramp, and is applied as a modifying value to a summing junction provided in the control circuit to produce a variable demand signal. The variable demand signal so generated is then compared with a signal representing a corresponding actual pressure relationship and the error signal, if any, so generated effects a corrective movement of the movable ramps until the error signal becomes zero.

6 Claims, 5 Drawing Figures

INTAKE CONTROL FOR AIR UTILIZING AIRCRAFT ENGINES

CROSS REFERENCE TO RELATED APPLICATION

This application is a continuation-in-part of application Ser. No. 526,005, filed Nov. 21, 1974, now abandoned.

FIELD OF THE INVENTION

The invention relates to the intake control for air utilizing aircraft engines, in particular of high-powered aircraft adapted for supersonic flight.

BACKGROUND OF THE INVENTION

The purpose of an intake control is to adjust the air intake flow to the engine air demand to achieve an optimum performance with respect to one another whereby to control the entire system as one compatible unit. The air intake has the purpose of feeding the required amount of air at minimum loss and in a properly homogeneous condition to the engine. Flow losses result, for example, from friction, compression shocks and excessive flow resistances; air inhomogenities result, for example, from pressure irregularities. If both disadvantages can be substantially avoided, then the power system of a given aircraft will produce optimum thrust. Furthermore, it is desirable that the air intake and the engine are in continuous cooperation or otherwise performance losses will occur, the consequences of which can be of various kinds. First of all, if the intake and engine operation go out of proper relationship to each other, compression vibrations occur in the power system, which, if they exceed certain permissible limits, can result in the mechanical destruction of air intake and/or engine.

The above-discussed relationships are of a special importance for power systems which are intended to operate through a larger range of flight speeds. Such engines have widely varying range of air demand depending on the respective flight conditions, which among other things is determined by mach number and engine speed. High-powered engines require, for example during starting an extremely high "corrected rate of airflow," which means that the most narrow flow cross section of the intake must be dimensioned as large as possible. Compared with this, the corrected rate of airflow must be extremely low at high supersonic flight, for example at mach 2.2, wherein the most narrow flow cross section of the intake must be dimensioned as small as possible to achieve the desired configuration of the compression shocks in the inlet area of the air intake.

Since each air intake of fixed cross section has a stable working range of only limited extent, an adjustable air intake must be provided, particularly for high-powered engines, in order to provide for appropriate adjustment. The present generally common automatic control or regulation of the air intake is taken over by the so-called intake control system.

For example a two-dimensional air intake for a high-powered aircraft has been suggested, which has a total of three ramps over its length and the longitudinal axis of which — as is common — extends parallel to the x-axis of the aircraft. Starting from the front of the aircraft, the first ramp is constructed fixedly and the second and third ramps are movable to vary the air intake. For this purpose the second and third ramps are connected mechanically through jointed means and linkages. An electrohydraulic operating cylinder engages the linkage and such cylinder is capable of adjusting synchronously the two movable ramps. The intake control system automatically controls the operating cylinder or the ramp actuator and said intake control system is, in the latest designs, based on an electronic digital calculator. A relatively wide gap exists between the second and the third ramps of the aforediscussed air intake, through which gap flows outwardly a part of the inner boundary layer and a part of the intake air. The space above the second or the center ramp is used as the measuring chamber for a pressure which serves as control parameter for the known intake control system. Furthermore, the following values are considered in the intake control: the static and the total pressure of the external flow and the angle of attack of a given aircraft. The relationship of the static (barometric) pressure to the total (pitot tube) pressure of the external flow indicates the flight mach number.

It is furthermore known to use pressure ratios in the air intake of jet engines for controlling the air intake. It is, for example, known to regulate the intake geometry as a function of the mach number and a typical pressure ratio (DAS 1,202,267 and U.S. Pat. No. 3,181,818). Another known system of this type, in which the main control parameter is the position of the compression shocks, uses pressure measuring points in the front part of the intake and a second variable element in the form of a blow-off valve (French Pat. No. 2,026,964). In all of these systems it is not possible in a simple manner to effect a required change of the control parameter, as same might become necessary, in consideration of the output and stability of the controlled system.

The basic purpose of the invention is to produce an intake control of the above-mentioned type, which permits modification of the control parameter in a selected manner so that an intake control for optimum performance is achieved in the entire flight speed range, wherein the required stability of the aerodynamically closed control loop and simultaneously the compatability between the intake and engine are assured. It is also the purpose of the invention to eliminate the bypass door-like structure used in combination with the structure which varies the geometry of the air intake duct.

According to the invention this purpose is attained by using a variable dimensionless relationship of the pressure above a movable center ramp to the total pressure of the external flow as control parameter. In particular, the invention is characterized by calculating this dimensionless pressure ratio relative to an operating cylinder (actual position) feedback signal and utilizing a sum of the ratio and other computed values as a determining value to adjust the optimum performance point of the power system, which latter has been previously determined through wind tunnel and/or flight testing.

BRIEF DESCRIPTION OF THE DRAWINGS

The invention is explained illustratively in the drawings, in which.

DETAILED DESCRIPTION

Figure 1:
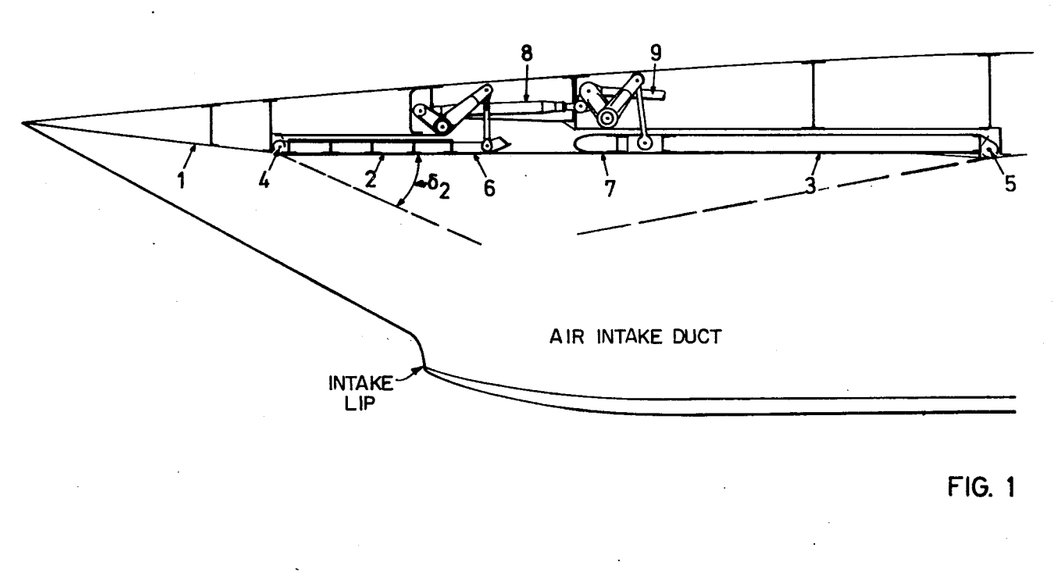
FIG. 1 is a schematic illustration of an intake configuration.

The intake configuration shown in FIG. 1 consists of the ramps 1, 2 and 3, of which the first is constructed fixedly and the two others are pivotable about the axes 4 and 5. The two free ends 6 and 7 of the ramps 2 and 3 are connected through a mechanical linkage 8 so that an actuator 28 (FIG. 3, not illustrated in FIG. 1) can synchronously move the two ramps 2 and 3 by operation of the lever 9 to provide the desired intake configuration. $\delta_2$ represents the angle of the ramp 2 relative to the ramp 1.

Figure 2:
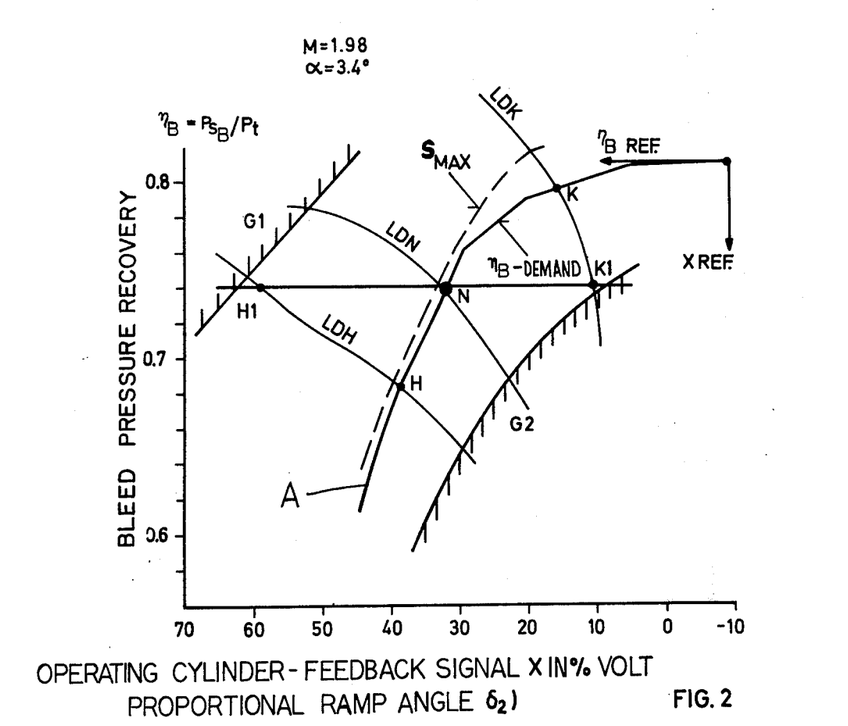
FIG. 2 is an aerodynamic performance graph of the inlet configuration according to FIG. 1.

The diagram appearing in FIG. 2 shows above the ramp angle $\delta_2$ the pressure ratio $\eta_B = P_{sB}/P_t$ for various rates of airflow $L_D$ of the engine, wherein the $L_D$-curves are entered for "hot day" ($L_{DH}$), "normal day" ($L_{DN}$) and "cold day" ($L_{DK}$). The pressure $P_{sB}$ is measured above the center, in this case above the second ramp 2. $P_t$ is the total pressure of the external flow, as measured, for example by a pitot tube and appearing as an electrical signal of a characteristic which is an indicatory function thereof. Further, the diagram shows aerothermodynamic stability limits $G_1$ and $G_2$ of intake and engine, namely at the left of the curve $G_1$ occurs intake buzz and at the right of the curve $G_2$ occurs engine surge. A line for a maximum thrust $S_{max}$ and an experimentally chosen control line $\eta_B$ demand, according to which the inlet is adjusted, are further shown. The diagram of FIG. 2 corresponds to the flight condition: Mach 1.98 at $\alpha = 3.4°$, wherein $\alpha$ is the angle of attack of the aircraft. For every other flight condition there will be a different control line with a separate demand value of the $\eta_B$. Same depends on respective engine rate of airflow, on the speed of the engine and on the ambient temperature. The points entered in the diagram H for hot day, N for normal day and K for cold day determine the range in which the engine operating point can move. This shows that the performance optimum $\eta_B$-demand changes greatly with the engine rate of airflow. In choosing the control lines it is important to assure sufficient margin of safety from the stability limits $G_1$ and $G_2$ inasmuch as the exceeding of such limits permits buzz or surge of the engine to occur.

Figure 3:
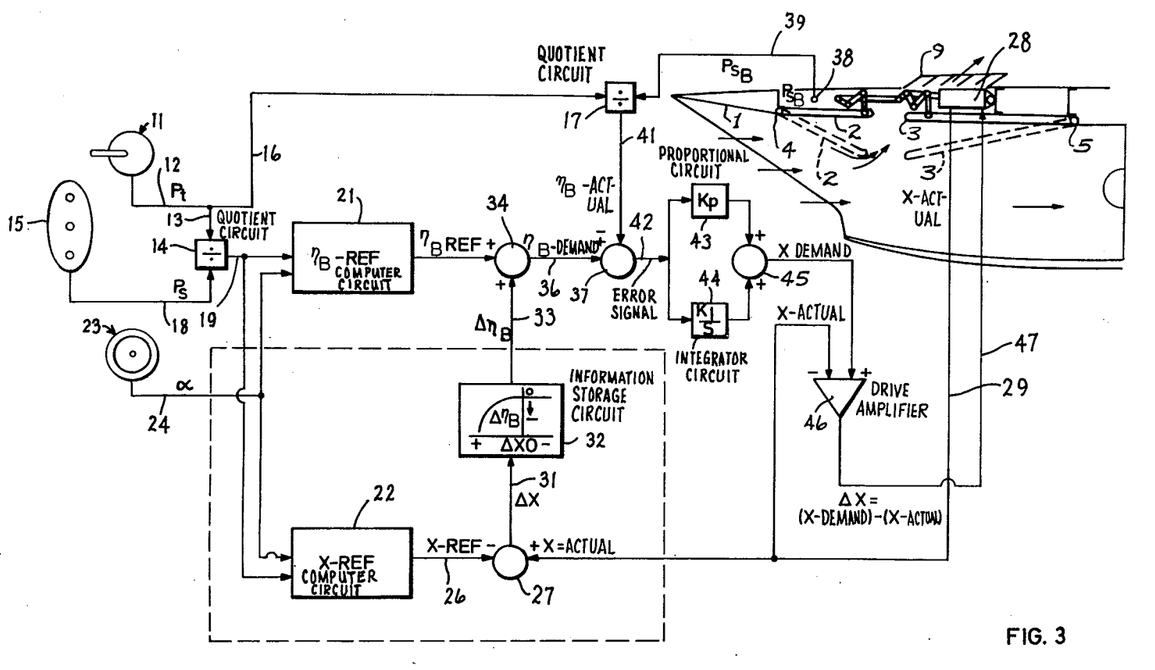
FIG. 3 is a control diagram further illustrating one embodiment of the invention.

Turning now to FIG. 3, for a control diagram of one specific embodiment of the invention, there are again shown the ramps 1, 2 and 3 as shown in FIG. 1 and the lever 9 of FIG. 1 is now shown as connected to an actuator 28 of any convenient type operable in response to the application thereto of a suitable electrical potential. The diagram shows the control means for energizing a line 47 comprising the input of the actuator 28 in response to five inputs as follows:

1. $P_{sB}$ — static pressure measured above ramp 2 and expressed as an analog electrical potential.
2. $P_t$ — measured free stream total pressure such as measured by a pitot tube and expressed as an analog electric potential.
3. $P_s$ — measured free stream static pressure (as barometric pressure) and expressed as an analog electrical potential.
4. $\alpha$ — aircraft angle of attack, measured in dedrees in any conventional manner and expressed an an analog electrical potential.
5. $x$ — actuator feedback signal, measured in mm and expressed by an analog electrical potential.

While the apparatus illustrated in FIG. 3 is of itself conventional, it may for a full understanding of the invention be described as follows.

The total pressure $P_t$ is measured by a pitot tube arrangement 11 and is fed through line 12 and 13 to one of two input terminals to a quotient circuit 14 as well as through lines 12 and 16 to one of two input terminals to another quotient circuit 17. The static pressure, such as barometric pressure, is fed from a sensor 15 through a line 18 to the other input terminal to the quotient circuit 14. The output terminal 19 of the quotient circuit 14 supplies a signal $P_s/P_t$ to one of two input terminals to a computer circuit 21 as well as one of two input terminals to another computer circuit 22. The aircraft angle of attack $\alpha$ is measured by a sensor 23 and is fed through a line 24 to the other input terminal of both of the computer circuits 21 and 22. The computer circuit 21 is capable of producing $\eta_B$-REF signal in response to variations in the signal $P_s/P_t$ supplied from the quotient circuit 14 and the signal $\alpha$ supplied from the sensor 23. Similarly, the computer circuit 22 produces an $x$-REF signal as a function of the signals $P_s/P_t$ and $\alpha$.

Figure 4:
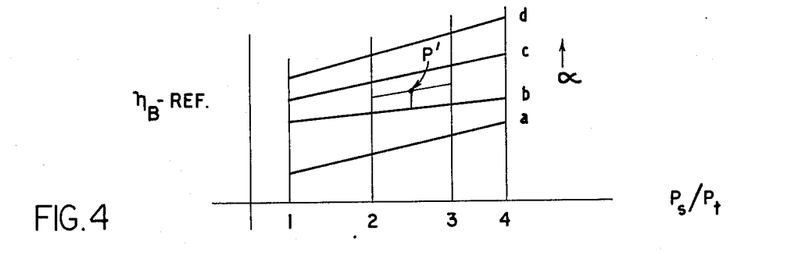
FIG. 4 is a sketch of a bi-variant map for the computer circuit 21.

Computer circuit 21 comprises ROM memory circuits which contain bi-variant maps $\eta_B$-REF as a function of $P_s/P_t$ and $\alpha$ as sketched for explanation purposes in FIG. 4.

Each line ($a, b, c, d$) for different $\alpha$'s are stored point-by-point using arbitrary selected break points, 1, 2, 3, 4 for $P_s/P_t$ within the ROM-memory of circuit 21 as binary numbers. The signal from the quotient circuit 14 ($P_s/P_t$) as well as the signal from sensor 23 are binary numbers and are used by the computer program by means of computer "search" and "linear interpolation" subroutines to determine the corresponding $\eta_B$-REF from the fixed point stored bi-variant map as described above. For example: Point P' is obtained by use of the break points 2 and 3 for $P_s/P_t$ and $b$ and $c$ for $\alpha$. Between these break points, the computer will interpolate linearly to determine P'. It should be noted that the binary numbers for $P_s/P_t$ (14) and $\alpha$ (24) have been obtained from measured analog signals for $P_s$, $P_t$ and $\alpha$ which are converted via an analog/digital converter - multiplexer of the controller within signal paths 18 ($P_s$), 12 ($P_t$) and 24 ($\alpha$) before entering the quotient circuits 14 and 17 and computer circuits 21 and 22. These A/D converters/multiplexers are not shown in FIG. 3 because it is part of the controller hardware, which is not the subject of this disclosure.

The $x$-REF data in computer 22 is also stored as a bi-variant map as a function of $P_s/P_t$ and $\alpha$ and the identical technique applies as described above. The same sketch as shown in FIG. 4 can be used but substituting $\eta_B$-REF with $x$-REF. The $x$-REF signal on the output terminal 26 from the computer circuit 22 is compared with the actual value of $x$ representing the position of the actuator 28 and consequently, the second ramp at a summing junction 27. The actual value of $x$ is detected by the position of an actuator 28 and a signal is supplied through the line 29 to the summing junction 27. A signal $\Delta x$ is fed through a line 31 to an information storage circuit 32 which converts the signal $\Delta x$ to an $\Delta\eta_B$ signal on the output line 33 from the information storage circuit.

Figure 5:
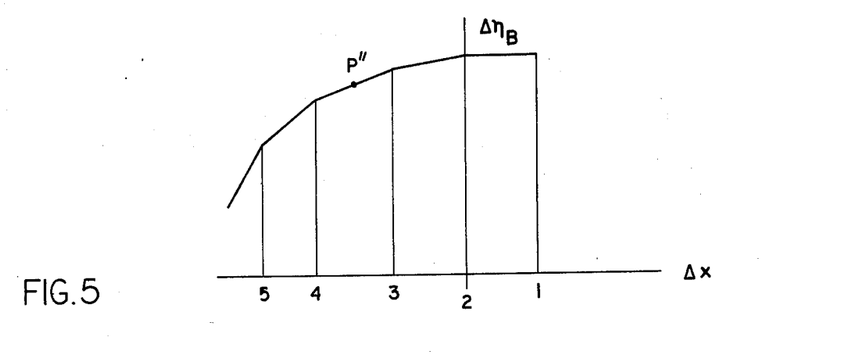
FIG. 5 is a sketch of a uni-variant map for the computer circuit 32.

More specifically, the circuit 32 in FIG. 3 contains a uni-variant map $\Delta\eta_B$ as a function of $\Delta x$ which is also stored point-by-point by use of the arbitrarily selected break points 1, 2, 3, 4, 5 for $\Delta x$ (see FIG. 5) in binary code in the ROM-memory Read Only Memory ROM chips on printed circuit boards of the controller. The summing junction 27 compares the binary number of $x$-REF from the computer 22, obtained as described above, with the actual measured feedback signal $x$-actual which has been converted prior to entering the summing junction 27 also via the already mentioned analog/digital converter/multiplexer into a binary number. By this comparison or summation, a $\Delta x$ is obtained. The computer 32 looks now again by means of search and interpolation subroutines to the neighbor breakpoints for the calculated $\Delta x$ (for example points 3 and 4 in FIG. 5) and determines P by linear interpolation between these two breakpoints. As already stated above, the calculator is a special purpose computer having four primary subroutines:

1. Subroutine: input interface control and sequencing of subroutines.
2. Subroutine: execution of bi-variant and uni-variant interpolation (linear).
3. Subroutine: as 2.
4. Subroutine: computation of different polynmminals for determination and compensation of pressure signals ($P_s$, $P_t$, $P_{sB}$).

The signal $\eta_B$-REF is summed with the signal $\Delta\eta_B$ at a summing junction 34 to produce a signal $\eta_B$-demand which is fed through a line 36 to a summing junction 37. The quotient of the static pressure $P_{sB}$ is measured above the second ramp by a sensor 38 and is fed through a line 39 to the other input terminal to the quotient circuit 17. The output terminal 41 from the quoient circuit 17 supplies a signal $P_{sB}/P_t$ to the summing junction 37. The difference in the two signals $\eta_B$-demand and $\eta_B$-actual produces an error signal on the line 42 from the summing junction 37. The error signal is subjected to both a proportional circuit 43 and an integrator circuit 44 to generate a ramp actuator demand signal (x-demand) at a summing junction 45. If a difference is found to exist between x-demand and x-actual, an actuator servo-valve current signal is created by the drive-amplifier 46 which is fed to the actuator 28 through a line 47 to move the actuator to the desired position. Such movement will occur until the signals x-demand and x-actual are equal.

By use of computer circuits 21 ($\eta_B$-REF), 22 ($x$-REF) and 32 ($\Delta\eta_B$) control lines as A in FIG. 2 can be reproduced in a simple way, which result in variable demand values of the control pressure ratio $\eta_B$ as a function of engine airflow for constant Mach number and constant angle of attack.

OPERATION

The operation of the intake control according to the invention will now be discussed further in connection with one example for which reference is again made to FIG. 2.

For each desired flight condition there is valid a corresponding performance graph of the intake of the nature as shown in FIG. 2. The control line for optimum thrust will usually require a variable $\eta_B$-demand and it is pure chance if a constant $\eta_B$ is required. If one does not return the operating cylinder feedback signal $x$ (actuator-stroke proportional to ramp angle), in order to modify the $\eta_B$-demand depending on the engine air need, one can specify only one constant $\eta_B$ as a function of mach number M and angle of attack $\alpha$.

This would, for example, correspond with the line H1-N-K1. It can thereby be recognized from the illustration, that one can place at an optimum the intake operating point only for one single point (for example point N = normal-day rate of airflow of the engine). The intake could not be adjusted to a performance optimum for cold day and hot day (curves $L_{DK}$ and $L_{DH}$) and would, in the illustrated example, come very close to the aero-thermodynamic limits $G_1$ or $G_2$ (intake buzz or engine surge). However, it is possible by using the operating cylinder feedback signal $x$ to modify the $\eta_B$-demand in such a manner that both "intake buzz" and also "engine surge" can be avoided and furthermore, the intake operates at each point at a performance optimum, namely along the line H-N-K. FIG. 3, for example, illustrates the use of this principle. A universal curve path was chosen for practical use for storage capacity reasons of the electronic digital calculator, which curve path was then moved corresponding with the respective flight condition vertically ($\eta_B$-REF in FIG. 3) and horizontally ($x$-REF in FIG. 3). However, it is possible basically to store any desired curve path for the respective flight condition (mach, $\alpha$) in the digital calculator, which is only a question of the storage capacity (see FIG. 2). The curve path of $\eta_B$-demand (H-N-K) is placed in such a manner into the intake performance graph, that optimum performance is achieved or at least well approached; attention being thereby paid simultaneously to the provision of a sufficient safety margin from the aero-thermodynamic instability limits. The final points of the curve path ($\eta_B$-REF and $x$-REF) are fed as functions of mach number and angle of attach ($\alpha$) as software into the digital calculator. The phrase "software" in the disclosure means the bi-variant maps for $\eta_B$-REF in the computer circuit 21, $x$-REF in the computer circuit 22 and the uni-variant map for $\Delta\eta_B$ in the computer circuit 32, which are stored point-by-point in the Read Only Memory chips in the computers.

By measuring the controlled output x-actual value through an analog/digital interface, the actual ramp position is determined. By comparing x-actual value with $x$-REF, a $\Delta x$ is formed, with the help of which one or more curves $\Delta\eta_B = f(\Delta x)$, which are also stored in the calculator, a $\Delta\eta_B$ is (are) calculated. This is (there are) added to the $\eta_B$-REF. and therewith produces a variable $\eta_B$-demand. The intake geometry is now adjusted until $\eta_B$-demand = $\eta_B$-actual. With this it is assured that the intake as related to the engine air requirement occurs at the desired performance optimum point on the control contour.

Turning now to the operation of the apparatus shown in FIG. 3, the position of the ramps 2 and 3 respond to the condition of an aerodynamically closed control loop which in turn responds to the value of the parameter $\eta_B = P_{sB}/P_t$. Briefly, the control system above-described calculates an $\eta_B$-demand value on the basis of several above-indicated inputs, namely the mach number, the angle of attack, and an output signal determined by the actual position of the ramp actuator, and this is forwarded to the summing point 37. The actual $\eta_B$ value is also applied to said summing point and so long as a difference exists between the two $\eta_B$ values the conductor 47 is appropriately energized to operate the ramp actuator 28 whereby to adjust the movable ramps until the $\eta_B$-demand value and the $\eta_B$-actual value attain equality.

In more detail, the actual second ramp position is obtained by measurement of the actual position feedback signal x-actual via an analog/digital interface. The reference value x-REF is computed as a function of $P_s/P_t$ and $\alpha$ is compared with the measured second ramp position x-actual. The resulting increment $\Delta x$ is then used to obtain an increment in $\Delta\eta_B$ as function of $\Delta x$ from the curved line which is also stored as software within the Automatic Control Unit program 32, namely the intake controller itself and which is then added to the calculated $\eta_B$-REF. The phrase software within the program 32 means in this respect the shape or the slope of the curve $\Delta\eta_B$ versus $\Delta x$, which in turn produces different shapes (slopes) of a control line A in FIG. 2 resulting in great flexibility for necessary changes. The sum of $\eta_B$-REF which is computed also as function of $P_s/P_t$ and $\alpha$ and $\Delta\eta_B$ gives the $\eta_B$-demand signal within the control loop, which is compared with the actual measured $\eta_B = P_{sB}/P_t$ and any error between these two signals if fed simultaneously through an integrator and proportional path where it is integrated and amplified in order to generate the ramp actuator demand signal x-demand which is compared with the actual ramp actuator position feedback signal x-circuit. If an error exists, an actuator servovalve current signal is created by the drive-amplifier and fed to the electro-hydraulic actuator to move to the desired position. The intake geometry will be varied in a closed loop control mode until $\eta_B$-demand is equal to $\eta_B$-actual, i.e. until the error is zero. By this method it is ensured that the intake operating point lies on the variable $\eta_B$-control line (control line A) depending on flight mach number ($P_s/P_t$), angle of attack ($\alpha$) and engine corrected airflow demand. Because the actuator position feedback signal $x$ is used in the $\eta_B$-control loop to modify the $\eta_B$-demand signal depending on engine airflow demand, the control concept of the invention is designated as closed loop $\eta_B$-control with open-loop-bias from the actuator position feedback, which is proportional to the second-ramp position $\delta_2$.

The advantages of the control plan of the invention compared with presently known solutions are:

The control contour of the intake can be chosed as desired so that 1. the intake can be controlled at a performance optimum at each working point within its stable capacity.
2. If any aerodynamic instabilities of the intake/engine occur, the control contour can be so modified that these limits are not exceeded.
3. The aerodynamic amplification of the controlled system, namely the difference of the inclinations of signal characteristic and control contour can be maintained approximately constant by choosing the respectively suitable control contour, so that stability of the entire control system is assured as being an also sufficient response behavior of the control.
4. This control plan becomes particularly flexible by using an electronic digital calculator within the control system, which can selectively be newly programmed.

Although particular preferred embodiments of the invention have been disclosed in detail for illustrative purposes, it will be recognized that variations and modifications of the disclosed apparatus, including the rearrangement of parts, lie within the scope of the present invention.

The embodiments of the invention in which an exclusive property or privilege is claimed are defined as follows:

1. An air intake control for an air intake in an air utilizing engine in a high-powdered aircraft having supersonic flight capability, said air intake control comprising:

means defining an air intake duct, said air intake duct being free of bypass passageway means for controlling the position of the shock waves ahead of said air intake duct means, movable ramp means mounted in said air intake duct means and being movable across said air intake duct means for controlling the amount of air passing therethrough, a movement of said ramp means toward a closing of said air intake duct means effecting a greater spillage of air around the outside of said air intake duct means;

drive means for moving said ramp means to selectable positions across said air intake duct means;

first signal producing means for producing a first signal indicative of the actual position of said movable ramp means;

control means for producing a variable second signal indicative of the aircraft's demand for a specific position of said ramp means across said air intake duct means, said control means including first pressure measuring means for measuring the static pressure at a location on one side of said ramp means remote from the intake opening into said air intake duct and producing a first electrical signal and second pressure measuring means for measuring the total free steam pressure in said air passageway and producing a second electrical signal, said control means being responsive to a ratio of said first electrical signal to said second electrical signal in producing said variable second signal; and comparator means for comparing said first signal with said variable second signal to effect an energization of said drive means to move said ramp means toward the aircraft's demanded position thereof.

2. An air intake control for an air intake in an air utilizing engine in a high-powered aircraft having supersonic flight capability, said air intake control comprising:

means defining an air intake duct;

movable ramp means including at least one ramp hingedly supported in said air intake and being movable about a hinge axis across an air passageway through said air intake duct means for controlling the amount of air passing therethrough, said hinge axis for said one ramp being secured to an upper interior surface of said air intake duct means and being located at an upstream end of said one ramp, said one ramp, when moved to a position partially blocking said air passageway, defining an acute angle with said upper interior surface of said air intake duct means;

actuator means for moving said ramp and including signal producing means for producing a first electrical signal indicative of the position of said ramp;

angle of attack detecting means for detecting said angle of attack of said aircraft and producing a second electrical signal;

first pressure measuring means for measuring the total free stream pressure in said air passageway and producing a third electrical signal;

second pressure measuring means for measuring the free stream static pressure in said air passageway and producing a fourth electrical signal;

third pressure measuring means for measuring the static pressure at a location above said one ramp and between said one ramp and said upper interior surface of said air intake duct means and producing a fifth electrical signal;

control means for producing a sixth electrical signal representing the aircraft's demand for a specific position of said one ramp in response to said first, second, third, fourth and fifth electrical signals; and comparator means for comparing said sixth signal with said first signal and producing a seventh electrical signal to effect an energization of said actuator means to move said one ramp toward the aircraft's demanded position thereof.

3. An air intake control according to claim 2, wherein said control means is responsive to a first ratio ($\eta_B$-actual) of said fifth signal to said third signal.

4. An air intake control according to claim 3, wherein said control means is responsive to a second ratio of said fourth signal to said third signal and includes first computer circuit means responsive to said second ratio and said second signal for producing an $\eta_B$-reference signal and a second computer circuit means to said second ratio and said second signal for producing an $x$-reference signal, said first and second computer circuit means having stored therein flight data determined by previous measurements in a wind tunnel and/or flight testing.

5. An air intake control according to claim 4, wherein said control means further includes a first summing junction for summing said x-reference signal and said first signal and an information storage circuit for converting a signal from said first summing junction to a $\Delta\eta_B$ signal, which is a function of said first signal, said control means also including a second summing junction for summing said $\eta_B$-reference signal and said $\Delta\eta_B$ signal to produce a $\eta_B$-demand signal and a third summing junction for summing said $\eta_B$-demand signal and said first ratio to produce said sixth signal.

6. An air intake control according to claim 2, wherein said ramp means includes two ramps, the second of said ramps being hingedly supported in said air intake, said hinge axis for said second ramp being secured to said upper interior surface of said air duct means and being located downstream of and parallel to said hinge axis for said one ramp, said one ramp and said second ramp being spaced apart when moved to a position partially blocking said air passageway; and including a bleed exit in said upper interior surface above said two ramps and between said hinge axes therefor, said third pressure measuring means being located between said hinge axis for said one ramp and said bleed exit.

* * * * *

UNITED STATES PATENT AND TRADEMARK OFFICE
CERTIFICATE OF CORRECTION

PATENT NO. : 4 025 008
DATED : May 24, 1977
INVENTOR(S) : Juergen Peikert

It is certified that error appears in the above-identified patent and that said Letters Patent are hereby corrected as shown below:

Change Foreign Application Priority Data date "1975" to
---1973---.

Column 8, line 5; change "high-powdered" to ---high-powered---.

Column 8, line 33; change "steam" to ---stream---.

Column 9, line 28; after "means" insert ---responsive---.

Column 10, line 19; after "air" insert ---intake---.

Signed and Sealed this

Eleventh Day of October 1977

[SEAL]

Attest:

RUTH C. MASON
Attesting Officer

LUTRELLE F. PARKER
Acting Commissioner of Patents and Trademark

UNITED STATES PATENT OFFICE
CERTIFICATE OF CORRECTION

Patent No. 4,025,008            Dated May 24, 1977

Inventor(s) Juergen Peikert

It is certified that error appears in the above-identified patent and that said Letters Patent are hereby corrected as shown below:

Inventor's name should read -- Juergen Peikert --.

Signed and Sealed this

Thirteenth Day of December 1977

[SEAL]

Attest:

RUTH C. MASON  
*Attesting Officer*

LUTRELLE F. PARKER  
*Acting Commissioner of Patents and Trademarks*